(12) United States Patent
Moradian

(10) Patent No.: US 6,312,509 B1
(45) Date of Patent: Nov. 6, 2001

(54) RUST PREVENTIVE COATING COMPOSITION

(76) Inventor: Ebrahim Moradian, P.O. Box 11292, Beverly Hills, CA (US) 90213

( * ) Notice: Subject to any disclaimer, the term of this patent is extended or adjusted under 35 U.S.C. 154(b) by 0 days.

(21) Appl. No.: 09/635,668

(22) Filed: Aug. 10, 2000

(51) Int. Cl.⁷ ..................... C09D 5/08

(52) U.S. Cl. .................. 106/14.35; 106/14.22; 106/14.23; 106/14.24; 106/14.27; 106/14.29; 106/14.34; 106/14.41; 106/14.43; 106/14.44

(58) Field of Search .............. 106/14.27, 14.29, 106/14.22, 14.23, 14.24, 14.34, 14.35, 14.41, 14.43, 14.44

(56) References Cited

U.S. PATENT DOCUMENTS 3,754,942 * 8/1973 Moradian .......................... 106/14.27

* cited by examiner

*Primary Examiner*—Anthony Green
(74) *Attorney, Agent, or Firm*—Jacobson Holman, PLLC

(57) ABSTRACT

Entirely asphaltic, micro-crystalline wax- and aluminum-based coating compositions, which are fully flexible and accommodate any expansion or contraction in steel structures, are prepared from various combinations of components, e.g. those selected from microcrystalline wax, naphthenic and paraffinic oils, oil-soluble alkali-metal sulfonate, gilsonite, linseed oil, naphthenic acid, solvent, a viscosity modifier, aluminum paste, attapulgite, emulsifier, milled cellulose fiber, ground mica, and silica gel, according to a described stepwise mixing procedure.

17 Claims, No Drawings

RUST PREVENTIVE COATING COMPOSITION

RELATED PATENT

This application is directed to subject matter related to that disclosed and claimed in U.S. Pat. No. 3,754,942, issued Aug. 28, 1973.

FIELD OF THE INVENTION

Micro-crystalline wax-based rust-preventive products and a method for making them.

BACKGROUND

U.S. Pat. No. 3,754,942 relates to a coating for preventing rust and corrosion on metallic surfaces. The compositions disclosed therein were the starting point for developing vastly enhanced products suitable for application to all metallic, wood and concrete-based surfaces and structures.

SUMMARY OF THE INVENTION

Entirely asphaltic, micro-crystalline wax- and aluminum-based coating compositions are fully flexible and accommodate any expansion or contraction in steel structures.

An object of the present invention is to provide a protective coating composition that is applicable to surfaces of various materials with minimal surface preparation; no sandblasting, sealing or priming is required.

Another object of the present invention is to provide a coating composition that will pass 1200 hours of ASTM B-117 salt spray tests and 4000 hours of QUV Weatherometer ASTM G-53 tests.

A further object of the, present invention is to provide a coating composition which is exempted from VOC (Volatile Organic Compound) requirements in many states.

A still further object of the present invention is to provide a coating composition which has UV resistance and provides protection against salt and chemical environments, such as acid, chlorine and ammonia.

Yet an additional object of the present invention is to provide a coating composition which can be applied directly over a rusted or painted surface.

Still another object of the present invention is to provide a coating composition with extreme flexibility without cracking, chipping, flaking or peeling.

The products of the present invention achieve the noted objectives by being extremely resistant to chemical, salt and corrosive environments. They bend without cracking, chipping, peeling or flaking. Further, they are resistant to UV fight up to 4000 hours under QUV Weatherometer ASTM G-53 testing standards. In addition, they are effective against salt spray up to 1200 hours, and they can be applied in one step, which does not require prior sandblasting, priming or sealing. Other objects will be apparent from the following description.

DETAILED DESCRIPTION

Coating compositions in accordance with the present invention are prepared from a number of different ingredients which contribute to the various properties of the end products. As the obtained coating compositions cure in situ after they are applied, reaction between or among components is contemplated.

Although only preferred embodiments of the invention are explained in detail, it is to be understood that the invention is not limited in its scope to the embodiments set forth in the following description. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

The ingredients employed for formulating the coating compositions of the present invention are set forth below in Table I:

TABLE I

| | |
|---|---|
| a) | microcrystalline wax, e.g. IGI Microsere 5714 Wax and M160, |
| b) | naphthenic and paraffinic oils, e.g. HTCR 45 process oil (manufactured from wax-free crude, non-staining, has great resistance to heat and UV light), Sunpar and Circosol 304, |
| c) | oil-soluble alkali-metal sulfonate, e.g. Petrosul 750 (sodium petroleum sulfonate), |
| d) | uintaite (pulverized gilsonite), |
| e) | boiled linseed oil, |
| f) | naphthenic acid - a naturally occurring, complex mixture of high molecular weight cycloaliphatic carboxylic acids recovered from petroleum distillates, e.g. Sunaptic acid, Shellflex 680 |
| g) | solvent, e.g. mineral spirit, Vista LPA 210, corn solvent (ethyl lactate), soy solvent (mixed fatty acid methyl esters), Hi-Sol 10 and Vansol 53, |
| h) | a body builder which is a 100% cationic salt functioning as a viscosity modifier, e.g. PA-14 (isodecyloxypropyl amine), |
| i) | aluminum paste (leafing or non-leafing), |
| j) | a gel grade of attapulgite, e.g. Attagel 20 (hydrous magnesium aluminum silicate) and Min-U-Gel ® FG, |
| k) | emulsifier, e.g. Redikote (emulsifier for medium-setting asphalt emulsions and co-emulsifier for quick-set slurry and microsurfacing emulsions), |
| l) | grey fibrous powder, biodegradable, non-hazardous, and non-toxic - will disperse in water with agitation, e.g. Interfibe ™ FT (medium length milled cellulose fiber), |
| m) | a dry ground muscovite mica product of platelet shape and high aspect ratio, e.g. AFLAKE 805 (potassium aluminum silicate) and Mica 805F, |
| n) | silica gel desiccant, e.g. Syloid ® AL-1, |
| o) | UV-resistant pigment, e.g. Levanyl (Green G-LF, Blue G-LF, Yellow 5GX-LF and Red BB-LF), |
| p) | dispersion of butyl rubber or polyisobutylene in paraffin or microcrystalline wax, e.g. Keywax rubber concentrate. |

Components (h), (i) and (l) to (p) are optional insofar as they are not essential to all contemplated coating compositions, although a number of them are essential to one or more such compositions. The UV protective pigment, e.g., is a significant component for coating compositions contemplated for outdoor use.

The relative proportion of the respective components is a significant factor. The overall weight percentage ranges for each of the components (when present) is as follows with each letter corresponding to the ingredient, listed under the same letter in Table I above:

(a) 5 to 60 (preferably 5 to 15);
(b) 0.02 to 25 (preferably 0.02 to 5);
(c) 0.05 to 20 (preferably 0.05 to 5);
(d) 10 to 50 (preferably 10 to 30);
(e) 1 to 25 (preferably 1 to 10);
(f) 0.5 to 5 (preferably 0.8 to 3.5);
(g) 15 to 70 (preferably 35 to 65);
(h) 0.05 to 12 (preferably 0.25 to 2);
(i) 10 to 35 (preferably 10 to 20);
(j) 1 to 18 (preferably 1.5 to 8);
(k) 1 to 12 (preferably 3 to 10);
(l) 1 to 30 (preferably 1 to 10);

(m) 2 to 27 (preferably 4 to 15);

(n) 0.5 to 17 (preferably 0.5 to 8);

(o) 2 to 35 (preferably 5 to 20); and (p) {this component is optionally used in combination with (a) and in an amount up to four times that of (a), with the combined amount not exceeding 60 weight percent; e.g. 20% mico-crystalline wax and 80% Keywax rubber concentrate, 30% micro-crystalline wax and 70% Keywax rubber concentrate, and 50% micro-crystalline wax and 50% Keywax rubber concentrate (the latter percentages being based on the total weight of both components)}.

Special Ingredients

Vista LPA 210 (product of CONDEA Vista Company) is 100% LVP-VOC (low vapor pressure-volatile organic compound) exempted from VOC laws in many states, and improves the flashpoint of the product to 226° F. It is a drying oil which is primarily a slow-drying solvent blend of iso- and cyclo-paraffins without benzene, toluene, ethylbenzene or xylene.

Optional alternative solvents include: i) Mixture of soybean solvent and corn oil solvent; ratio: 50/50, 20/80, 30/70; 10/90; ii) Straight mineral spirit solvent 100%; iii) Straight corn oil solvent 100%; iv) 80% corn oil, 20% mineral spirit; v) Soygold 1000—methylated seed oil (product of AG Environmental Products L.L.C.) has passed the South Coast Quality Management District testing and is designated a clean air solvent; vi) Soysolv®—methyl ester of soya oil (product of Soysolv®), soybean solvent; vii) Soysolv® Cornsolv—ethyl lactate (product of Soysolv®), corn oil solvent.

Keywax rubber concentrate (product of Key Polymer) is dispersion of butyl rubber or polyisobutylene in paraffin or microcrystalline wax.

PA-14 (product of Tomah™ Products, Inc.) is a body builder which is a 100% cationic salt (isodecyloxypropyl amine) functioning as a viscosity modifier. It improves product sealing ability.

Attagel 20 (product of Engelhard Corporation) is a gel grade of attapulgite, similar to Min-U-Gel; used in admixture with RediKote (E-9A, 75TX and/or E-5, individually or in any combination). Attagel 20 acts as a thickener, suspension agent and bonder to improve bonding, quicken coating curing, and increase sealing and adhesion of the coating on all types of surfaces.

Min-U-Gel® FG (product of Floridin division of ITC Industries) is a hydrous magnesium aluminum silicate with gelling and Theological properties.

Redikote® (product of Akzo Nobel Chemicals Inc.) is an emulsifier. Redicote E-9A contains amines and is for medium-setting asphalt emulsions and co-emulsifier for quick-set slurry and microsurfacing emulsions. Rodicote 75TX contains amines and is for coal tar sealers. Rodicote E-5 contains 2-propanol, water and chloride ion, is corrosive to carbon steel and some stainless steels, and is for cationic medium-setting and slow-setting asphalt emulsions.

Interfibe™ (product of Interfibe Corporation) is grey fibrous powder, medium length milled cellulose fiber (non-hazardous alternative to asbestos fiber), biodegradable, non-hazardous, and non-toxic. It will disperse in water with agitation and improves uniformity, physical properties, dispersion, sag, slump, oil retention and tensile strength. It also stabilizes viscosity. By improving suspension of aluminum, it also enhances orientation of aluminum and color pigments. Further, it provides good leafing characteristics without hard-packed setting in containers and provides good trowel and brush resistance, reinforcement and sag resistance. In addition, it maintains a uniform fiber structure in the cured undercoating and eliminates clogging when the product is sprayed by conventional or airless guns.

Aflake 805 (product of ZEMEX Industrial Minerals) is a dry ground muscovite mica product (potassium aluminum silicate) in platelet shape and having a high aspect ratio. It is chemically inert, easily dispersible, and high temperature stable. It acts as a barrier and increases coating coverage and resin forcement of the coating.

Syloid® AL-1 (product of W.R Grace & Co.) is a silica gel desiccant. By absorbing moisture in the containers, it prevents hydrogen gas formation, hence increases shelf life, coating quality and performance of metal coatings by physically trapping moisture.

HTCR 45 process oils (product of La Corporation TRI-BOSPEC$^{MD}$ Corporation); similar to Circosol 304 is light in color, non staining-type naphthenic oil manufactured from selected wax-free crudes. It has excellent initial color and ultra-violet light stability with high aromatic content and other properties desirable in naphthenic oils used with most synthetic polymers.

Leafing and non-leafing aluminum, color pigments are added for fast drying, enhanced UV resistance and increased coverage. Sunaptic Acid is a mixture of oil and naphthenic acid. Hi-Sol 10 is an aromatic hydrocarbon solvent. Sunpar is a paraffinic petroleum oil. And, Circosol is a naphthenic oil.

Finally, Naphthenic and Paraffinic Oil is a mixture containing a) from about 5 to 95 weight percent of paraffinic oil having an API gravity, at 60° F., ranging from about 28.5 to 31, and a pour point at about 0° F. and b) from about 95 to 5 weight percent of naphthenic oil with about 30 to 45 weight percent of naphthenic carbon atoms, an API gravity, at 60° F., ranging from about 20 to 28, a pour point of about −50° F., and a molecular weight of from about 200 to 300.

EXAMPLES

The compositions are prepared in a particular fashion, which comprises the following steps (insofar as the respective components are present):

i) melting the microcrystalline wax (a), ii) admixing mineral spirit and Vista LPA 210, boiled linseed oil or processed marine oil, paraffinic oil and high molecular weight naphthenic acid, iii) admixing Attagel 20 and RediKote, and then combining the resulting product with Interfibe FT, iv) admixing AFlake 805 and PA-14 with oil-soluble alkali metal sulfonate, and then combining the resulting admixture with the product of step (iii), v) admixing the product of step (iv) with the product of step (ii), vi) admixing the product of step (v) with the product of step (i), vii) admixing gilsonite with the product of step (vi), and viii) after the resulting composition is well blended, admixing therewith leafing or non-leafing aluminum and color pigmented ingredient(s) and, optionally, silica gel with slow agitation. The microcrystalline wax is optionally combined with Keywax rubber concentrate.

Following the procedure outlined above, compositions are prepared from the components set forth in Table II below.

TABLE II

| Example | 1 Weight % | 2 Weight % | 3 Weight % | 4 Weight % | 5 Weight % | 6 Weight % | 7 Weight % |
|---|---|---|---|---|---|---|---|
| Vansol 53 | 60.54 | 49.00 | 32.71 | 47.87 | 43.71 | 43.69 | 47.38 |
| Gilsonite 300 | 20.96 | 16.88 | 18.24 | 16.58 | 14.95 | 14.95 | 16.21 |
| Boiled Linseed Oil | 2.74 | 2.21 | 2.38 | 2.23 | 1.95 | 1.95 | 2.12 |
| Shellflex 680 | 0.83 | 0.71 | 0.76 | 0.68 | 0.63 | 0.63 | 0.68 |
| Naphthenic Acid Refined | 1.25 | 1.00 | 1.09 | 0.97 | 0.89 | 0.89 | 0.97 |
| Petrosol 750 | 0.09 | 0.07 | 0.08 | 0.07 | 0.06 | 0.06 | 0.07 |
| HTCR 45 | 0.03 | 0.02 | 0.03 | 0.02 | 0.02 | 0.02 | 0.02 |
| IGI Microsere 5714 Wax | 8.29 | 6.67 | 7.21 | 6.60 | 5.91 | 5.91 | 6.41 |
| PA-14 | 0.72 | — | — | — | — | — | — |
| Attagel 20 | 4.50 | 2.18 | 3.91 | 3.20 | 3.21 | 3.21 | 3.48 |
| Interfibe FT | — | 2.18 | — | — | — | — | — |
| Aluminum Paste 130 | — | 18.12 | 12.58 | 12.87 | 12.35 | 12.35 | 13.39 |
| Syloid AL-1 | — | 0.96 | 1.01 | 0.99 | 0.95 | 0.95 | 1.03 |
| Levanyl Green G-LF | — | — | — | 7.92 | — | — | — |
| Levanyl Blue G-LF | — | — | — | — | 15.35 | — | — |
| Levanyl Yellow 5GX-LF | — | — | — | — | — | 15.38 | — |
| Levanyl Red BB-LF | — | — | — | — | — | — | 8.24 |
| Total | 100.00 | 100.00 | 100.00 | 100.00 | 100.00 | 100.00 | 100.00 |
| Viscosity, Spindle 4/10 rpm (cps) | 1120 | 6000 | 2160 | 3200 | 12480 | 6040 | 6200 |
| Specific Gravity | 0.93 | 1.00 | 0.96 | 1.00 | 1.00 | 1.00 | 1.00 |

The product of Example 1 is useful with a fill-and-drain system for ballast tanks, box girders and all void areas of ships and submarines. It is designed specifically for interior surfaces, underground and underwater pipes, interior panels of automobiles, cables and wire ropes, industrial fabrications, sewage and filtration plants, refineries and hot-roll steels, for example, steel mills and steel construction.

The product of Example 2 is useful for exterior surfaces, such as bridges, storage tanks, exterior pipelines, refineries, industrial fabrications, nuclear and regular power generators, telephone and power poles, flashing gutters, skylight coatings and hot-roll steels.

The products of Examples 3 to 7 vary in color from tan, light green, blue, yellow (gold), and red, respectively. They are designed for exterior surfaces like bridges, storage tanks, exterior pipelines, refineries, industrial fabrications, nuclear and regular power generators, telephone and power poles, flashing gutters, and skylight coatings.

Example 8

Following the mixing procedure outlined above, a composition is prepared from the following components where the letters correspond to the components listed in Table I:

| Component | Weight Percent |
|---|---|
| g) Hi-Sol 10 (or alternative solvent) | 46.94 |
| d) Pulverized Gilsonite | 18.37 |
| e) Boiled Linseed Oil | 3.12 |
| b) Sunpar 2280 (sunaptic acid) | 0.99 |
| f) Naphthenic Acid (refined) | 1.42 |
| c) Petrosul 750 | 0.09 |
| b) Circosol 304 (naphthenic oil) | 0.03 |
| a) M-160 Wax | 9.39 |
| h) PA-14 | 0.82 |
| j) Attagel 20 | 5.10 |
| l) Interfibe FT | 5.10 |
| m) Mica 805F | 8.63 |
| | 100.00 |

The product of Example 8 is formulated for both exterior and interior surfaces. It is a superior industrial strength coating produced especially for use in industries involved in highly corrosive environments, such as chemical plants, offshore platforms, oil rigs, pipelines, storage tanks, flashing and skylight coating businesses. It should be applied for either 12 mil or 21 mil (DFT) dry film thickness, either by brush or airless gun. In this example, each of the components is optionally replaced by a corresponding product and processed according to the disclosed method.

Approximate parts by weight of respective components for three additional types of compositions within the scope of this invention are indicated in Table III below. Again, the ingredient is that which corresponds to the letter designation as listed in Table I. Although the amount of emulsifier (k) is not specified, the amount used varies with the amount of component (j) and is adequate for accomplishing the incorporation of component (j) in the prepared admixture according to the disclosed preparation process.

TABLE III

| Component | A | B | C |
|---|---|---|---|
| a) | 8.3 | 6.7 | 5.8–9.5 |
| b) | 0.03 | 0.02 | 0.02–0.035 |
| c) | 0.09 | 0.07 | 0.05–0.10 |
| d) | 21 | 17 | 14–21 |
| e) | 2.75 | 2.2 | 1.9–3.2 |
| f) | 2.15 | 1.7 | 1.5–2.5 |
| g) | 61 | 49 | 43–63 |
| h) | 0.72 | — | 0.5–1.0 |
| i) | — | 18 | 12–19 |
| j) | 4.5 | 2.2 | 2–5 |
| k) | — | — | — |
| l) | — | 2.2 | — |
| m) | — | — | — |
| n) | — | 0.95 | 0.9–1.1 |
| o) | — | — | 7–16 |

Compositions prepared from the subject components according to the prescribed procedure have the following attributes: 1) One-step application (requires minimum surface preparation—no need for sandblasting, priming or sealing; 2) No lead content; 3) Applicable to all surfaces, including galvanized metals, wood and concrete block; 4) 100% sealing ability to stop oxygen penetration; 5) Rust prevention underneath coating; 6) Allows coated surfaces to be welded and re-coated; 7) Extreme flexibility—will not crack, peel or chip; 8) Protects against UV light (except compositions prepared for indoor use); 9) Eliminates condensation—moisture repellant; and 10) can be painted over existing painted or rusted surfaces.

The compositions are applied to substrates to achieve a thickness of approximately 21 mil (DFT) dry film thickness, either by brush or airless gun. The films as so applied cure in air at ambient temperature.

In the disclosure and claims when reference is made to "substantially the same as", that means that all disclosed critical attributes are within ±5% of the compared subject matter. When reference is made to "about" or "approximately", the same ±5% variance is contemplated.

The invention and its advantages will be readily understood from the foregoing description. Various changes may be made in the process, components and compositions without departing from the spirit and scope of the invention or sacrificing its material advantages. The process and products hereinbefore described are merely illustrative of preferred embodiments of the invention.

What is claimed is:

1. A rust preventive coating composition which is substantially the same as that comprising components (a), (b), (c), (d), (e), (f), (g), (j), (k) and, optionally, (h), (i), (l), (m), (n), (o) and (p) and/or any in situ reaction product thereof:
    (a) 5 to 60 weight percent of micro-crystalline wax having a melting point of at least about 150° F.,
    (b) 0.02 to 25 weight percent of i) HTCR oil or ii) a mixture of naphthenic and paraffinic oil,
    (c) 0.05 to 20 weight percent of oil-soluble alkali-metal sulfonate having a molecular weight in the approximate range of from 400 to 550,
    (d) 10 to 50 weight percent of pulverized gilsonite,
    (e) 1 to 25 weight percent of boiled linseed oil or processed marine oil,
    (f) 0.5 to 5 weight percent of naphthenic acid,
    (g) 15 to 70 weight percent of solvent,
    (h) 0.05 to 12 weight percent of cationic salt body-building viscosity modifier,
    (i) 10 to 35 weight percent of leafing or non-leafing aluminum paste,
    (j) 1 to 18 weight percent of a gel grade of attapulgite or hydrous magnesium aluminum silicate with gelling and rheological properties,
    (k) 1 to 12 weight percent of emulsifier,
    (l) 1 to 30 weight percent of fibrous powder which is water dispersible with agitation,
    (m) 2 to 27 weight percent of a dry ground muscovite mica powder in platelet form,
    (n) 0.5 to 17 weight percent of silica gel desiccant,
    (o) 2 to 35 weight percent of light-fast, fast-drying, dispersed, UV-resistant pigment,
    (p) a dispersion of butyl rubber or polyisobutylene in paraffin or microcrystalline wax;
wherein the weight percentages are based of the total weight of formulating components.

2. A composition of claim 1 which is curable.

3. A composition of claim 1 which is cured.

4. A composition of claim 1 wherein the microcrystalline wax is in combination with a dispersion of i) butyl rubber in paraffin or microcrystalline wax or ii) polyisobutylene in paraffin or microcrystalline wax, and the weight ratio of the dispersion to the microcrystalline wax is up to about 4 to 1.

5. A composition of claim 1 herein the alkali-metal sulfonate is a sodium sulfonate.

6. A composition of claim 1 wherein the solvent (g) is a drying oil.

7. A composition of claim 6 wherein the drying oil is mainly a solvent blend of iso- and cyclo-paraffins.

8. A composition of claim 1 wherein component (b) is a light in color, non-staining process oil from selected wax-free crude.

9. A composition of claim 1 wherein the naphthenic and paraffinic oil comprise a mixture containing a) from about 5 to 95 weight percent of paraffinic oil having an API gravity, at 60° F., ranging from about 28.5 to 31, and a pour point at about 0° F. and b) from about 95 to 5 weight percent of naphthenic oil with about 30 to 45 weight percent of naphthenic carbon atoms, an API gravity, at 60° F., ranging from about 20 to 28, a pour point of about −50° F., and a molecular weight of from about 200 to 300.

10. A composition of claim 1 which passes 1200 hours of salt spray ASTM B-117 tests when coated on a metal, wood or concrete-block substrate and cured.

11. A composition of claim 10 which is UV-resistant for up to 4000 hours under ASTM B-53 testing standard when coated on a metal, wood or concrete-block substrate and cured.

12. A composition of claim 1 wherein the microcrystalline wax (a) is in admixture with a dispersion of i) butyl rubber in paraffin or microcrystalline wax or ii) polyisobutylene in paraffin or microcrystalline wax.

13. A composition of claim 1 wherein approximate parts by weight of various components are as follows:
    (a) 8.3 parts;
    (b) 0.03 part;
    (c) 0.09 part;
    (d) 21 parts;
    (e) 2.75 parts;
    (f) 2.15 parts;
    (g) 61 parts;
    (h) 0.72 part;
    (j) 4.5 parts; and a sufficient amount of (k).

14. A composition of claim 1 wherein approximate parts by weight of several components are as follows:
    (a) 6.7 parts;
    (b) 0.02 part;
    (c) 0.07 part;
    (d) 17 parts;
    (e) 2.2 parts;
    (f) 1.7 parts;
    (g) 49 parts;
    (i) 18 parts;
    (j) 2.2 parts;
    (l) 2.2 parts;
    (n) 0.95 part; and sufficient (k).

15. A composition of claim 1 wherein approximate parts by weight of noted components are as follows:
    (a) 5.8 to 7.3 parts;
    (b) 0.02 to 0.035 part;
    (c) 0.05 to 0.10 part;
    (d) 14 to 21 parts;
    (e) 1.9 to 2.8 parts;
    (f) 1.5 to 2.2 parts;
    (g) 43 to 63 parts;

(i) 12 to 18 parts;

(j) 2 to 5 parts;

(n) 0.9 to 1.1 parts;

(o) 7 to 16 parts; and sufficient (k).

16. A composition of claim 1 wherein an approximate weight percent of specified components is as follows:

(a) 9.39%;

(b) 0.03%;

(c) 0.09%;

(d) 18.37%;

(e) 3.12%

(f) 1.51%;

(g) 46.94%;

(h) 0.82%;

(j) 5.10%;

(l) 5.10%;

(m) 8.63%; and sufficient (k).

17. A method of preparing a rust preventive coating composition of claim 1, which comprises the following sequential steps:

(1) melting component (a)

(2) admixing components (g), (e), (b) and (f), (3) admixing components (j) and (k), and combining the resulting product with component (l), (4) admixing components (h) and (m) with component (c), and then combining the resulting admixture with the product of step (3), (5) admixing the product of step (4) with the product of step (2), (6) admixing the product of step (5) with the product of step (1), (7) admixing component (d) with the product of step (6), (8) after the resulting composition is well blended, adding thereto components (i) and (o), and mixing.

* * * * *